United States Patent [19]

Sommer et al.

[11] 4,022,959

[45] May 10, 1977

[54] ORGANOLITHIUM-LEWIS BASE POLYMERIZATION OF 1,3-BUTADIENE AND NOVEL POLYBUTADIENES THUS PRODUCED

[75] Inventors: Neithart Sommer; Karl-Heinz Nordsiek, both of Marl, Germany

[73] Assignee: Chemische Werke Huels Aktiengesellschaft, Marl, Germany

[22] Filed: June 4, 1975

[21] Appl. No.: 583,839

Related U.S. Application Data

[63] Continuation of Ser. No. 378,010, July 10, 1973, abandoned, and Ser. No. 92,259, Nov. 23, 1970, abandoned.

[30] Foreign Application Priority Data

Nov. 22, 1969 Germany ............................ 1958650

[52] U.S. Cl. ............................... 526/180; 526/181; 526/335
[51] Int. Cl.$^2$ ........................................... C08F 4/48
[58] Field of Search ............. 260/94.2 M; 526/181, 526/180, 335

[56] References Cited

UNITED STATES PATENTS

| | | | |
|---|---|---|---|
| 3,301,840 | 1/1967 | Zelinski | 260/94.2 M |
| 3,451,988 | 6/1969 | Langer | 260/94.6 |
| 3,502,746 | 3/1970 | Miles | 260/94.2 M X |
| 3,829,409 | 8/1974 | Sommer et al. | 260/94.2 M |
| 3,887,535 | 6/1975 | Minekawa et al. | 260/94.2 M |

FOREIGN PATENTS OR APPLICATIONS 1,958,650   5/1971   Germany .......................... 260/94.2

*Primary Examiner*—William F. Hamrock
*Attorney, Agent, or Firm*—Millen & White

[57] ABSTRACT

Homopolymers of butadiene having a vinyl content which varies substantially and decreasingly along the longitudinal axis of the macromolecule toward an end thereof are produced by conducting an organolithium-Lewis base catalyzed polymerization at a substantially constantly increasing polymerization temperature throughout the polymerization.

3 Claims, No Drawings

ORGANOLITHIUM-LEWIS BASE POLYMERIZATION OF 1,3-BUTADIENE AND NOVEL POLYBUTADIENES THUS PRODUCED

This is a continuation of application Ser. No. 378,010, filed July 10, 1973, now abandoned and Ser. No. 92,259, filed Nov. 23, 1970, now abandoned.

BACKGROUND OF THE INVENTION

This invention relates to a novel process for the polymerization of 1,3-butadiene employing an organolithium-Lewis base catalyst system and to novel polybutadienes thus produced.

It is conventional to polymerize butadiene in an inert diluent employing an organolithium compound as catalyst. In the known process, polybutadienes are obtained having a 10% vinyl group content.

It is also known that polybutadienes having higher vinyl group contents can be produced by the addition to the catalyst system of a suitable Lewis base, such as, for example, ether (I. Kuntz, A. Gerber, J. Polym. Sci. 42, 299 [1960]), Depending on the type and amount of the Lewis base added, polybutadienes of any desired vinyl group content between 11 and 88% can be produced. (Dutch Published Patent Application No. 68,09,874). The vinyl group content of the polybutadienes does not depend solely on the type and amount of the Lewis base employed. If a higher polymerization temperature is employed, a polymer with a lower vinyl group content is obtained. (A.W. Langer; A. Chem, Soc. Div. Polymer Chem. Reprints; Vol 7 (1), 132 [1966]).

In the previously known processe for the polymerization of butadiene in the presence of a Lewis base, the polymerization is conducted isothermically, i.e., at a constant polymerization temperature. Under these conditions, polybutadienes are obtained having vinyl groups which are uniformly distributed along the longitudinal axis of the macromolecule. This uniform distribution of the vinyl groups is based on long-range order (order-disorder phenomenon).

The polybutadiene homopolymers produced by an isothermic polymerization employing any particular catalyst system varies according to the selected polymerization temperature. However, whatever the selected temperature, the resultant homopolymer does not have optimum properties for certain end-uses.

As disclosed in the copending application of Karl-Heinz Nordsiek et al. entitled "Tread Strips for Tires Formed of Homopolymers of Polybutadiene," S.N. 92,537, filed November 24, 1970,now Pat. No. 3,741,927, issued June 26, 1973), butadiene-styrene copolymers are conventionally employed in the rubber blends used to produce tire tread in order to obtain a vulcanizate having both acceptable wearing properties and skid resistance and because conventional polybutadiene homopolymers have poor processing properties. Thus, although processing economies would result if a polybutadiene homopolymer could be employed as the prepolymer in the production of tire tread vulcanizates, heretofore rubber blends have been used.

It has now been found that novel polybutadiene homopolymers having the requisite processing conditions and whose vulcanizates have the desired optimum combination of properties for many enduses, especially tire treads, without blending with other rubbers can be produced according to the process of this invention.

OBJECTS OF THE INVENTION

It is an object of this invention to provide novel polybutadiene homopolymers. It is another object to provide such homopolymers having good processing characteristics in the production of vulcanizates. It is still another object to provide such homopolymers whose vulcanizates have a combination of properties heretofore possessed only by copolymers and blends. A further object is the provision of a novel process for the production of such polymers. Other objects will be apparent to those skilled in the art to which this invention pertains.

SUMMARY OF THE INVENTION

According to this invention, polybutadienes with an average vinyl group content of 15–75% whose vinyl groups are distributed along the longitudinal axis of the macromolecule toward one end thereof in a substantially decreasing manner, are produced by polymerizing 1,3-butadiene in the presence of a catalyst system consisting essentially of an organolithium compound and a Lewis base in an inert diluent at a substantially constantly increasing polymerization temperature.

The novel polybutadienes obtained by the process of this invention have an average vinyl group content of about 15–75%, preferably about 20–50%, especially about 30–45%. These novel polybutadiene homopolymers are characterized by a vinyl group content which decreases substantially along the longitudinal axis of the macromolecule toward an end thereof. By "substantially" is meant that the end of the polymer molecule having the lowest vinyl group content has a content which is at least 15%, preferably 20–60%, lower than the average vinyl group content of the total molecule, i.e., the portion of the macromolecule with the highest vinyl group content has a 35 – 88 % content and the end portion with the lowest vinyl group content has a 10 – 25 % content.

DETAILED DISCUSSION

The vinyl group content of the last-produced end-portion of the macromolecule can be calculated by determining the average vinyl group content of the corresponding homopolymer produced by an isothermic polymerization at the initial temperature employed in an otherwise identical polymerization in which the temperature is permitted to rise continuously to a higher final temperature, and calculating the vinyl group content of the terminal portion of the macromolecule, i.e., the portion formed at the final higher temperature, from the difference between the average vinyl group content of the homopolymer thus-produced and the average vinyl group content of the homopolymer produced under otherwise idential conditions at either a progressively increasing temperature to a final higher temperature according to this invention.

For example, if a catalyst system is employed which produces a polybutadiene having an average vinyl group content of 40% when conducted from 40° C. (initial) to 102° (final), and a 52% content when conducted throughout at 40° C., the vinyl group content of the terminal (last formed) end portion of the molecule is about 24%.

As stated above, the average vinyl group content of the novel polybutadienes of this invention is 15–75%, depending on the selected catalyst system and the initial and final polymerization temperature. They have a molecular weight of from $0.7 \cdot 10^5$ to $8.0 \cdot 10^5$ preferably $1.8 \cdot 10^5$ to $6.5 \cdot 10^5$.

In addition to the vinyl groups, the homopolymers of this invention, 5–35%, preferably 15–30% is cis-1,4-units and 20–60%, preferably 35–55% is trans-1,4-units. They have a Mooney viscosity (ML-4) of 10–145, preferably 30–110, and a deformation elasticity of 10–40, preferably 15–30. The homopolymers of this invention are solid polymers whose vinyl group content render them suitable for use as prepolymers in the formation of vulcanizates according to conventional procedures.

The vinyl groups of the novel polybutadiene vary along the longitudinal axis of the macromolecules decreasingly toward the end thereof. Because the reaction temperature increases substantially throughout the polymerization, this decrease in vinyl group content along the molecule is substantially constant, i.e., each segment of the macromolecule has a higher vinyl group content than the adjacent segment closer to the end of the macromolecule having the lowest. Of course, if polymerization has occurred on both ends of the molecule, the central portion of the molecule will have the highest vinyl group content and if polymerization proceeds in only one direction on the molecule, then one end of the macromolecule will have a high vinyl group content and the other end, the low vinyl group content.

In the preferred polybutadiene homopolymers, the rate of decrease of the vinyl groups along the macromolecule is substantially uniform, i.e., the decrease is gradual and constant from the maximum, at the portion of the molecule produced at the lowest (initial) polymerization temperature, to the minimum, at the end portion produced at the highest (final) polymerization temperature.

Although in the preferred homopolymers the decrease in vinyl group content along the macromolecule is substantially constant, it will be apparent that some variations are possible while still retaining many of the advantageous properties. For example, if the reactor is not heated at the end of the polymerization, maximum polymerization temperature may be reached before the polymerization is complete, in which case a segment of the macromolecule proximate but not at the last-formed end of the molecule may have the lowest vinyl group content. similarly, if the initial portion of the polymerization is not cooled, the rate of decrease in vinyl group content of the initially formed portion of the molecule may be somewhat higher than that of the portion formed at the end of the polymerization. However, as long as the vinyl group content decreases substantially along the longitudinal axis and that decrease is substantially constant, the above-described minor variations from a uniformly constant rate of decrease will not eliminate the advantageous combination of properties of the resulting homopolymer.

The catalyst system employed in the process of this invention consists essentially of an organolithium compound and a Lewis base.

Examples of suitable organolithium compounds are the alkyllithiums, e.g., methyllithium, ethyllithium, n-, sec.-, and tert.-butyllithium, amyllithium, aryllithiums, e.g., phenyl-lithium, and cycloalkyllithiums, e.g., cyclohexyllithium. The organolithium compounds are usually employed in amounts of 0.01– 0.1% by weight, preferably 0.02– 0.05% by weight, based on butadiene.

Suitable Lewis bases are ethers, e.g., of one of the formulae R-O-R' and R-O-R'-O-R' wherein R and R', which can be alike or different, are aliphatic, preferably alkyl, groups of 1–20 carbon atoms or aromatic, preferably aryl, groups of 6–14 carbon atoms and R' is a bridging difunctional group, e.g., alkylene of 1–4 carbon atoms, e.g., diethyl ether, di-n-propyl ether, diisopropyl ether and di-n-butyl ether, cyclic ethers, e.g., tetrahydrofuran and dioxane, and polyethers, ethylene glycol dimethyl ether, ethylene glycol diethyl ether, diethylene glycol dimethyl ether, diethylene glycol diethyl ether and triethylene glycol dimethyl ether; and tertiary amines, e.g., trialkylamines, including trimethylamine, triethylamine, dialkyldiamines, including N,N,N',N'-tetramethylethylenediamine, heterocyclic amines, including N-methyl morpholine, N-ethyl morpholine, and arylamines, including N-phenyl morpholine. Also suitable are dialkyl and diaryl sulfides wherein alkyl and aryl are as defined above and non-functionally reactive phosphorous compounds, e.g., hexamethyl phosphoric acid triamide.

Difunctional Lewis bases, such as, for example, 1,2-di-methoxyethane and N,N,N',N'-tetramethylethylenediamine, exhibit a substantially higher effectiveness than monofunctional Lewis bases, such as, for example, tetrahydrofuran or triethylamine.

A single Lewis base or a mixture thereof can be employed. The amount of Lewis base employed can vary widely, e.g., 0.01–10% by weight, preferably 0.05–5% by weight, based on the butadiene.

The weight ratio of Lewis base to organolithium compound in the catalyst system also can vary widely, e.g., 0.1 : 1 to 1,000 : 1, preferably 1 : 1 to 250 : 1. The polymerization is conducted in an inert organic diluent, preferably an aliphatic or aromatic hydrocarbon, such as, for example, propane, iso- and n-butane, iso-and n-pentane, iso- and n-hexane, iso- and n-heptane, iso- and n-octane; cyclobutane, cyclopentane, cyclohexane, cycloheptane and cyclooctane; benzene, toluene, o-, m-, and p-xylene and ethylbenzene. The diluent can be employed in pure form or in the form of a mixture of one or more compounds.

According to this invention, the polymerization of the 1,3-butadiene is conducted at an increasing polymerization temperature, thus obtaining polymers having a distribution of the vinyl groups which constantly varies decreasingly and preferably uniformly along the longitudinal axis of the macromolecule toward an end thereof.

In order to prove the influence of polymerization temperature on the distribution of the vinyl groups along the macromolecules, the progress of the polymerization at a constant reaction temperature and at an increasing reaction temperature was determined. The results are compiled in Tables 1 and 2.

As shown in Table 1, at a constant reaction temperature, employing the same amount and type of a Lewis base, the higher the reaction temperature, the lower the vinyl group content of the homopolymer produced.

TABLE 1

| Experiment No. | Polymerization Temperature ° C. | Tetrahydrofuran (a) | n-Butyllithium (b) | RSV (c) | Vinyl Group Content % |
|---|---|---|---|---|---|
| 1 | 45 | 1 | 0.03 | 2.7 | 38 |
| 2 | 70 | 1 | 0.03 | 2.5 | 23 |

(a) Percent by weight, based on butadiene.
(b) Active catalyst, percent by weight, based on butadiene.
(c) 0.2% Solution in toluene at 25° C. (Dilute Solution Viscosity)

As shown in Table 2, with the same amount and type of Lewis base, increasing the reaction temperature during the polymerization also decreases the vinyl group content of the polybutadiene thus produced. However, in the polymers thus produced, the distribution of the vinyl groups varies constantly, i.e., varies in a decreasing manner along the longitudinal axis of the macromolecule toward an end thereof as a result of the polymerization temperature constantly increasing as the molecule is being formed. Thus, the distribution of the vinyl groups along the macromolecule is "asymmetrical." (The data set forth for finyl group contents represent average values for the total molecule.)

TABLE 2

| Experiment No. | Polymerization Temperature ° C. Initial | Polymerization Temperature ° C. End | Temperature Rise $\Delta T$ ° C. | Weight Ratio Hexane : Butadiene | Tetra-hydro-furan (a) | n-Butyl-lithium (b) | RSV (c) | Vinyl Group Content (Average) % |
|---|---|---|---|---|---|---|---|---|
| 4 | 41 | 102 | 61 | 80 : 20 | 1 | 0.03 | 2.5 | 36 |
| 5 | 40 | 102 | 62 | 80 : 20 | 2 | 0.03 | 2.6 | 40 |
| 6 | 60 | 126 | 66 | 80 : 20 | 2 | 0.03 | 3.0 | 32 |
| 7 | 72 | 154 | 82 | 80 : 20 | 2 | 0.03 | 4.0 | 27 |
| 8 | 55 | 110 | 55 | 85 : 15 | 0.3 (d) | 0.03 | 2.85 | 48 |

(a), (b), (c) - See Table 1
(d) - ethylene glycol dimethyl ether

In Experiment Nos. 3 and 5, the vinyl group content of the polymerizate was determined at various stages of the polymerization. As shown in Table 3, with a constant reaction temperature (Experiment No. 3), the vinyl group content remains substantially constant as the polymerization progresses. This means that, when the reaction is conducted isothermically, polybutadienes are obtained in which the vinyl groups are distributed uniformly along the longitudinal axis of the macromolecule.

TABLE 3

| Conversion % | Reaction Temperature ° C. | RSV (c) | Content of Vinyl Groups % |
|---|---|---|---|
| 43 | 49 | 1.2 | 34 |
| 56 | 49 | 1.6 | 33 |
| 70 | 49 | 2.0 | 34 |
| 100 | 49 | 3.0 | 33 |

(c) See Table 1.

In contrast thereto, as shown in Table 4, with a constantly increasing reaction temperature, the vinyl group content decreases as the polymerization progresses (Experiment No. 5). The results set forth in Table 4 also demonstrate that when polymerizing with an increasing reaction temperature, polybutadienes are produced in which the distribution of the vinyl groups constantly varies uniformly along the longitudinal axis of the macromolecule. In other words, the segment of the molecule formed at the initial stage of the polymerization has a higher concentration of vinyl groups than the final or end portion formed at the final stage of the polymerization because the initial segment was formed at a lower temperature.

TABLE 4

| Conversion % | Reaction Temperature ° C. | RSV (c) | Vinyl Group Content (Average) % |
|---|---|---|---|
| 0 | 40 (initial) | — | — |
| 43 | 60 | 1.1 | 49 |
| 67 | 70 | 1.5 | 47 |
| 99 | 102 (final) | 2.6 | 40 |

(c) See Table 1.

Two temperature values are important in the polymerization of 1,3-butadiene according to this invention, viz., the initial temperature $T_A$, i.e., the temperature at which the polymerization is initiated, and $\Delta T$, the temperature gradient over which the polymerization is conducted.

The polymerization according to this invention can be initiated at starting temperatures ($T_A$) of 30°–100° C., preferably below 90° C., e.g., 60° C. Starting temperatures below 30° C. are not practical because the polymerization rate would be too low. The temperature gradient increase ($\Delta T$) through which the polymerization proceeds is 30°–125° C., preferably at least 50° C., e.g., 66° C. The final temperature, i.e. the sum of the starting temperature ($T_A$) and the temperature gradient ($\Delta T$), must not exceed 155° C. because polymerization temperatures above 155° C. do not produce the polymers of the present invention.

The polymerization at an increasing temperature can be conducted either adiabatically or non-adiabatically. In an adiabatic polymerization, no heat is added or removed during the course of the polymerization, $\Delta T$ being determined by the heat of polymerization less heat loss. In a non-adiabatic polymerization, the magnitude of $\Delta T$ is controlled by adding or removing heat during the course of the polymerization. The magnitude of $\Delta T$ can also be regulated by the reaction diluent and the amount thereof employed, i.e., on the specific heat of the diluent and the ratio of diluent to butadiene.

Due to heat losses which normally occur in a polymerization conducted on a commercial scale, the usual polymerization does not proceed strictly adiabatically. The size of the heat losses depends in part on the ratio of surface to volume of the reaction system. With larger reaction vessels, the heat losses are less. The magnitude of the heat losses also depends on the polymerization time. Shorter polymerization times, due to higher starting temperatures, result in lower heat losses.

Experiments 5 through 7, set forth in Table 5 below, show that heat losses are dependent on polymerization time.

TABLE 5

| Experiment No. | Polymerization Minutes | Polymerization Temperature ° C Initial ($T_A$) | $\Delta T$ ° C. | Heat Losses % |
|---|---|---|---|---|
| 5 | 30 | 40 | 62 | 39 |
| 6 | 9 | 60 | 66 | 34 |
| 7 | 7 | 72 | 82 | 15 |

It is also possible to simulate an adiabatic polymerization by heating the external walls of the reaction vessel proportionately as the temperature increases in the interior of the reaction vessel. In such a case, when heat losses are zero, the theoretical temperature increase ($\Delta T$) occurs.

As is known, linear unbranched polybutadenes having relatively poor processing properties are obtained in the polymerization of butadiene catalyzed by organolithium compounds at temperatures below 90° C. A yardstick therefor are the low deformation-elasticity values of such products. In polymerizations above 90° C., long-chain, branched products are obtained as a result of transmetallization reactions, as described in detail in British Pat. No. 1,143,690. These branched polybutadienes are distinguished by considerably better processing properties and their deformation-elasticity values are correspondingly high. The polybutadienes produced according to the process of this invention exhibit, depending on the polymerization temperatures employed to produce them, an analogous array of properties.

As shown in Table 6, a considerable increase in the deformation-elasticity values is associated with polymerization temperatures above 90° C., resulting in considerably improved processing properties of the products. Thus, in a preferred embodiment, the reaction is conducted to a final temperature of from 90°–155° C., preferably 110°–145° C.

TABLE 6

| Experi-ment No. | Polymerization Temperature ° C. Initial | Polymerization Temperature ° C. Final | Vinyl Group Content (Average) % | ML-4 100° C. | Deformation-Elasticity at 80° C. |
|---|---|---|---|---|---|
| 9 | 38 | 70 | 32 | 44 | 4 |
| 10 | 42 | 106 | 32 | 46 | 17 |
| 11 | 66 | 136 | 25 | 50 | 26 |
| 12 | 72 | 155 | 23 | 45 | 22 |

The polymerization of this invention can be conducted under the inherent pressure of the reaction solution. However, it is also possible to select any desired higher pressure, employing an inert gas, e.g., nitrogen or argon.

The polymerization can be conducted discontinuously as well as continuously. However, care must be taken to exclude all substances which would destroy the catalyst, e.g., water, alcohols, carbon dioxide and oxygen. After the polymerization has been effected, a conventional stabilizer customary for polybutadienes is added to the solution of the polymer.

It was surprising and unforeseeable that by a controlled changing of the temperature during the polymerization, the distribution of the vinyl groups within each macromolecule could be varied in a controlled fashion. Conducting the polymerization at an increasing temperature, especially under adiabatic reaction conditions, affords additional process advantages, especially the elimination of the heat removal problems, which problems were difficult to overcome in conventional polymerization processes, and the elimination of the need for maintaining a constant polymerization temperature. Moreover, the process of this invention offers the possibility of producing polybutadienes at temperatures above 90° C., which produces polymers having an advantageous combination of properties, viz., a distribution of the vinyl groups which varies decreasingly along the longitudinal axis of the macromolecule plus a long-chain branching effect.

The polybutadienes which can be produced according to the process of this invention exhibit rubber-elastic properties which render them very well suted as starting materials for vulcanizates. They can be vulcanized by conventional methods or first mixed with large amounts of aliphatic or aromatic oils and carbon black, and the vulcanized.

As disclosed in the above-identified application of Nordsiek et al., the polybutadiene homopolymers of this invention are particularly useful in the production of automobile tire treads.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

Experiments 1 to 3 (Comparative Experiments)

A 3-liter autoclave is charged, with careful exclusion of air and moisture, with a total of 1.2 kg. of diluent, 1,3-butadiene, and Lewis base. The reaction solution is heated to the desired polymerization temperature and then the organolithium compound is added. By first cooling and later by heating, a constant reaction temperature is maintained. After termination of the reaction, 0.5% by weight of di-tert.-butyl-p-cresol ("IONOL") is added, based on the butadiene and the reaction mixture is worked up, the diluent being separated with steam. After drying, the properties of the polymer are determined.

Experiments 4 to 12

A 150-liter autoclave is charged, with careful exclusion of air and moisture, with a total of 65 kg. of diluent, 1,3-butadiene, and Lewis base. The reaction solution is heated to the starting temperature $T_A$ and then the organolithium compound is added. After termination of the reaction, i.e., after maximum pressure or temperature is reached, the reaction mixture is cooled. The reaction temperature differential $\Delta T$ is the difference between the maximum, i.e., end, temperature and the starting temperature of the polymerization. Then, 0.5% by weight of di-tert.-butyl-p-cresol ("IONOL"), based on the butadiene, is added and the reaction mixture worked up, the diluent being separated with steam. After drying, the properties of the polymer are determined.

The reaction conditions of the comparative experiments and the experiments are compiled in Table 7, and the properties of the polymers thus obtained are set forth in Table 8.

TABLE 7

| Reaction Conditions | | | | | | | | |
|---|---|---|---|---|---|---|---|---|
| Experi-ment No. | Hexane Parts by Wt. | 1,3-Butadiene Parts by Weight | THF % (1) | n-Butyl-lithium % (2) | Temperature ° C. | $T_A$ ° C. | $\Delta T$ ° C. | Reaction Time Minutes |
| 1 | 80 | 20 | 1 | 0.03 | 45 | | | 240 |
| 2 | 80 | 20 | 1 | 0.03 | 70 | | | 30 |
| 3 | 80 | 20 | 0.5 | 0.03 | 49 | | | 50 |

TABLE 7-continued

Reaction Conditions

| Experiment No. | Hexane Parts by Wt. | 1,3-Butadiene Parts by Weight | THF % (1) | n-Butyl-lithium % (2) | Temperature °C | $T_A$ °C | $\Delta T$ °C | Reaction Time Minutes |
|---|---|---|---|---|---|---|---|---|
| | | | | | 49 | | | 65 |
| | | | | | 49 | | | 100 |
| | | | | | 49 | | | 240 |
| 4 | 80 | 20 | 1 | 0.03 | | 41 | 61 | 30 |
| 5 | 80 | 20 | 2 | 0.03 | | 40 | | 0 |
| | | | | | 60 | | | 15 |
| | | | | | 70 | | | 20 |
| | | | | | 102 | | 62 | 30 |
| 6 | 80 | 20 | 2 | 0.03 | | 60 | 66 | 9 |
| 7 | 80 | 20 | 2 ethylene glycol dimethyl ether | 0.03 | | 72 | 82 | 7 |
| 8 | 85 | 15 | 0.3 THF | 0.03 | | 55 | 55 | 10 |
| 9 | 90 | 10 | 0.5 | 0.03 | | 38 | 32 | 35 |
| 10 | 80 | 20 | 1 | 0.03 | | 42 | 64 | 30 |
| 11 | 80 | 20 | 1 | 0.035 | | 66 | 70 | 8 |
| 12 | 80 | 20 | 1 | 0.04 | | 72 | 83 | 7 |

(1) Percent by Weight, based on 1,3-butadiene.
(2) Active catalyst, percent by weight, based on 1,3-butadiene.

TABLE 8

Properties of the Polymers

| Experiment No. | ML-4 100° C. | RSV (1) | Gel | Deformation Hardness/ Deformation Elasticity (2) | trans-Groups | cis-Groups (Microstructure) | vinyl-Groups (3) |
|---|---|---|---|---|---|---|---|
| 1 | 56 | 2.7 | <2 | | 39 | 23 | 38 |
| 2 | 44 | 2.5 | <2 | | 47 | 30 | 23 |
| 3 | | 1.2 | | | 39 | 27 | 34 |
| | | 1.6 | | | 39 | 28 | 33 |
| | | 2.0 | | | 40 | 26 | 34 |
| | 67 | 3.0 | <2 | | 40 | 27 | 33 |
| 4 | 44 | 2.5 | <2 | | 41 | 23 | 36 |
| 5 | | | | | | | |
| | | 1.1 | | | 33 | 18 | 49 |
| | | 1.5 | | | 33 | 20 | 47 |
| | 59 | 2.6 | <2 | | 38 | 22 | 40 |
| 6 | 70 | 3.0 | <2 | | 41 | 27 | 32 |
| 7 | 118 | 4.0 | <2 | | 45 | 28 | 27 |
| 8 | 66 | 2.85 | <2 | | 32 | 20 | 48 |
| 9 | 44 | 2.5 | <2 | 210/4 | 41 | 27 | 32 |
| 10 | 46 | 2.5 | <2 | 375/17 | 43 | 25 | 32 |
| 11 | 50 | 2.5 | <2 | 500/26 | 46 | 29 | 25 |
| 12 | 45 | 2.5 | <2 | 425/22 | 50 | 25 | 23 |

(1) 0.2% Solution in toluene at 25° C.(Dilute Solution Viscosity)
(2) Deformation hardness and deformation-elasticity at 80° C.
(3) By IR spectroscopy; 2.5% solution in carbon disulfide.

Comparative Experiments 1 and 2 demonstrate that with the same type and amount of Lewis base and conducting the polymerization under isothermic conditions, at higher reaction temperatures, the vinyl group content of the polybutadiene is lower.

As shown by the constant vinyl content of samples withdrawn during the course of the polymerization, distribution of the vinyl groups along the longitudinal axis of the macromolecule is completely uniform (Comparative Experiment 3). As shown by Experiments 5, 6 and 7, when the polymerization is conducted under adiabatic conditions, average vinyl group content also decreases at higher reaction temperatures. However, as seen by the samples of Experiment 5 withdrawn during the course of the polymerization, the average vinyl group content decreases as the polymerization progresses so that the distribution of the vinyl groups along the longitudinal axis of the macromolecule is nonuniform and constantly varies in one direction. In other words, the vinyl group content varies substantially along the length of the molecule, in a uniformly decreasing manner, in the direction of one or both ends of the macromolecule.

The long-chain branching which occurs at polymerization temperatures above 90° C. is evident from the RSV-values of Experiments 5, 6 and 7. As reaction temperature is increased, the RSV-values of the resulting polymers increase, i.e., the molecular weight of the polymers becomes larger, even though the same amount of active catalyst is employed. The considerable increase in the deformation-elasticity values accompanying the long-chain branching can be seen from a comparison of the data obtained in Experiments 10, 11 and 12 with that of Experiment 9.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the production of solid polybutadienes having long-chain branching and containing vinyl groups varying substantially along the longitudinal axis of the macromolecule which comprises polymerizing 1,3-butadiene in the presence of an alkyllithium-Lewis base catalyst system having a weight ratio of Lewis base to alkyllithium compound of 0.1 : 1 to 1,000 : 1 and the Lewis base is a monofunctional ether, a difunctional ether or a tertiary amine, in an inert diluent at a starting temperature of at least 60° C and with in increasing polymerization temperature substantially throughout the polymerization such that the temperature gradient through which the polymerizaton progresses is at least 50° C, and the reaction is conducted to a final temperature up to 155° C.

2. A polybutadiene produced in accordance with claim 1.

3. A process according to claim 1 wherein the catalyst is added only at the beginning of the polymerization.

* * * * *